United States Patent
Valentine et al.

(10) Patent No.: US 6,356,547 B1
(45) Date of Patent: Mar. 12, 2002

(54) SOFTWARE DEFINED DIGITAL LOOP CARRIER SYSTEM

(75) Inventors: Eric Valentine, Plano; Walter Lee Davidson, McKinney, both of TX (US)

(73) Assignee: Ericsson Inc., Richardson, TX (US)

(*) Notice: Subject to any disclaimer, the term of this patent is extended or adjusted under 35 U.S.C. 154(b) by 0 days.

(21) Appl. No.: 09/198,699

(22) Filed: Nov. 24, 1998

(51) Int. Cl.[7] .................................................. H04L 7/02
(52) U.S. Cl. ........................................ 370/360; 370/404
(58) Field of Search .................................. 370/360, 419, 370/420, 421, 422, 423, 424, 463, 465, 466, 467, 400, 401, 403, 404, 405; 379/93.08, 93.28, 93.29, 93.31, 242, 243; 375/220

(56) References Cited

U.S. PATENT DOCUMENTS 5,852,630 A * 12/1998 Langberg et al. ............ 375/219
6,047,061 A *  4/2000 Cornes et al. ................ 379/333
6,067,316 A *  5/2000 Amrany et al. .............. 375/220
6,070,213 A *  5/2000 Giordano ..................... 710/128
6,084,887 A *  7/2000 Salisbury et al. ............ 370/467
6,118,772 A *  9/2000 Giordano et al. ............ 370/328
6,208,664 B1 *  3/2001 Plummer et al. ............ 370/480
6,240,337 B1 *  5/2001 Marr, Jr. et al. ............ 700/286

* cited by examiner

*Primary Examiner*—Dang Ton
*Assistant Examiner*—Phirin Sam
(74) *Attorney, Agent, or Firm*—Arthur I. Navarro; Godwin Gruber, P.C.

(57) ABSTRACT

A software definable DLC architecture (75) based on high speed analog-to-digital converters (64) and digital signal processors (66) capable of sampling to at least several MHz. Multiple copper pair wires (102) are attached to a single DSP (66) and upbanding is applied at staggered intervals so that all copper pairs reside in distinct spectral bands. Signals arriving from a single copper pair is sampled and digitized within the spectral band associated with each subscriber side service. The encoded digitized result is transmitted back to the central office (35) for decoding into the relevant signaling scheme according to the type of service attached to the subscriber (15).

14 Claims, 2 Drawing Sheets

SOFTWARE DEFINED DIGITAL LOOP CARRIER SYSTEM

TECHNICAL FIELD

The present invention relates generally to subscriber side communications and more specifically to a software defined communications interface that accommodates changes in communications protocol from a centralized location rather than at the subscriber's physical connection.

BACKGROUND OF THE INVENTION

Often, the deployment of new communications technology places a burden on the subscriber to update their software and hardware in order to keep pace with current communication standards. For example, data communications over twisted pair wiring has resulted in a push for faster modems and improved signaling protocols compatible with the public switch telephone network. At present, analog modem technology is capable of transmission speeds close to 56 kbps which provides a boost in performance from the previous standard of bi-directional 36.6 kbps. The result has been the introduction by U.S. Robotics, Rockwell and other manufacturers of "56K" modems.

Other examples includes the emerging variety of xDSL communications protocols including asymmetric digital subscriber line (ADSL), symmetric digital subscriber line (SDSL), high bit rate digital subscriber line (HDSL), and very high rate digital subscriber line (VDSL). Each xDSL variant represents a different transmission speed over a different distance of copper pair wiring. In order to take advantage of the protocol, the subscriber must obtain the appropriate application programs and hardware facilities that enable the signaling protocol to be applied in the channel coupling the subscriber to their service of choice. Often, the line circuits servicing the subscriber must be updated, modified or replaced through hardware and/or software changes.

Thus, while new communications standards can be implemented without modifying the internal wiring in a customer's home or business, the communication equipment that enable such protocols must be updated, modified or replaced in order to implement the standard.

Apart from changes to the subscriber's equipment, the introduction of new protocols also dictate changes in the call exchange facilities provided to service subscribers within a given geographic area. Typically a digital loop carrier (DLC) system is provided to handle the loop connections extending from subscriber to the call exchange facility in a subscriber area. Local loops of twisted pair copper wiring extend from the subscriber premise or customer premise equipment to the DLC. The DLC, in turn, is responsible for the routing calls placed by all subscribers in the service area to a centralized call exchange facility such as the local telco central office.

Originally, twisted pair wiring offered sufficient bandwidth for plain old telephone service (POTS) where frequencies stayed in the voice band of 300 to 3.4 kHz. Thus, DLCs could be designed to handle signaling within a relatively limited bandwidth compared to today's standards. The introduction of new communications protocols with bandwidth requirements outside POTS and at many thousands of subscriber sites, however, means that large scale deployment can be prohibitively costly since the equipment must remain in place for years. In many situations, total replacement can be too expensive making deployment of new equipment in order to keep pace with new communications protocols impossible.

While prior art DLCs have become more flexible, each new protocol still requires a specific hardware design. In essence, each DLC contains interface and protocol specific hardware without satisfactory remote reconfiguration and bandwidth optimization to accommodate technology deployments.

SUMMARY OF THE INVENTION

The invention discloses a software definable DLC architecture based on high speed analog-to-digital (A/D) converters and digital signal processors capable of sampling to at least several MHz. Since each subscriber copper pair utilizes less than 1 MHz of bandwidth, multiple copper pair wires can be attached to a single DSP. Upbanding can be applied at staggered intervals so that all copper pairs reside in the distinct spectral bands. Signals arriving from a single copper pair can be sampled and digitized within the spectral band associated with each subscriber loop. The encoded digitized result can be transmitted back to the central office for decoding into the relevant signaling scheme according to the type of service attached to the subscriber. Preferably, the DSPs are reprogrammable so that subscriber upgrades are implemented more readily and more efficiently through a common media signal pathway. Updates in the customer premise equipment can be accomplished remotely through software deployed from a third party administration or maintenance facility, through the central office, or at the DLC.

According to one embodiment, a communications device for carrying signals from a subscriber to the centralized call exchange facility is disclosed. The communications device includes an interface to the subscriber and a signal processor coupled to the interface and configured to receive signals transmitted from the subscriber location. A second interface to a centralized call exchange facility is provided and arranged to receive processed signals from the signal processor. The communications device may also include a memory space storing a set of software algorithms that control the functionality of the signal processor. A digital-to-analog signal converter can be interspersed between the first interface and the signal processor to transform analog signals received from the subscriber to digital signals suitable for transmission to the centralized call exchange facility.

According to another embodiment, a software defined digital loop carrier (DLC) is disclosed. The DLC includes an interface to a plurality of subscriber lines with line circuits coupled thereto. The line circuits support the communications protocol utilized in each of the subscriber lines. The line circuits are programmable to accommodate modifications or deployment of new subscriber side protocols. The DLC also includes an interface to the trunk line leading to a centralized call exchange facility.

Each of the line circuits in the DLC includes an interface to a wire pair and a signal processor coupled to the interface and then configured to receive signals from a subscriber site. A second interface is provided between the line circuit and the trunk line leading to the centralized call exchange facility. A memory space such as Random Access Memory (RAM) or other similar electronic memory configuration is used to store a set of software algorithms that control the functionality of the signal processor associated with one or more of the wire pairs. In one embodiment, the software algorithms include instructions capable of implementing an xDSL protocol.

An advantage of the invention is that it allows flexible provisioning of services without hardware reconfiguration allocation or management thus reducing the overall cost of service changes and new service introductions.

Another advantage of the invention is that large scale deployment of new communications technology can be accomplished from a centralized location such as an operations or management facility or the local central office.

Still another advantage is that the same core DLC architecture can be utilized for more than one subscriber pair thus simplifying the call routing mechanisms servicing a group of subscribers.

BRIEF DESCRIPTION OF THE DRAWINGS

Other aspects of the invention including specific embodiments are understood by reference of the following detailed description taken in conjunction with the appended drawings in which.

Corresponding numerals and symbols in the figures refer to corresponding parts in the detailed description unless otherwise indicated.

DETAILED DESCRIPTION OF PREFERRED EMBODIMENTS

Figure 1:
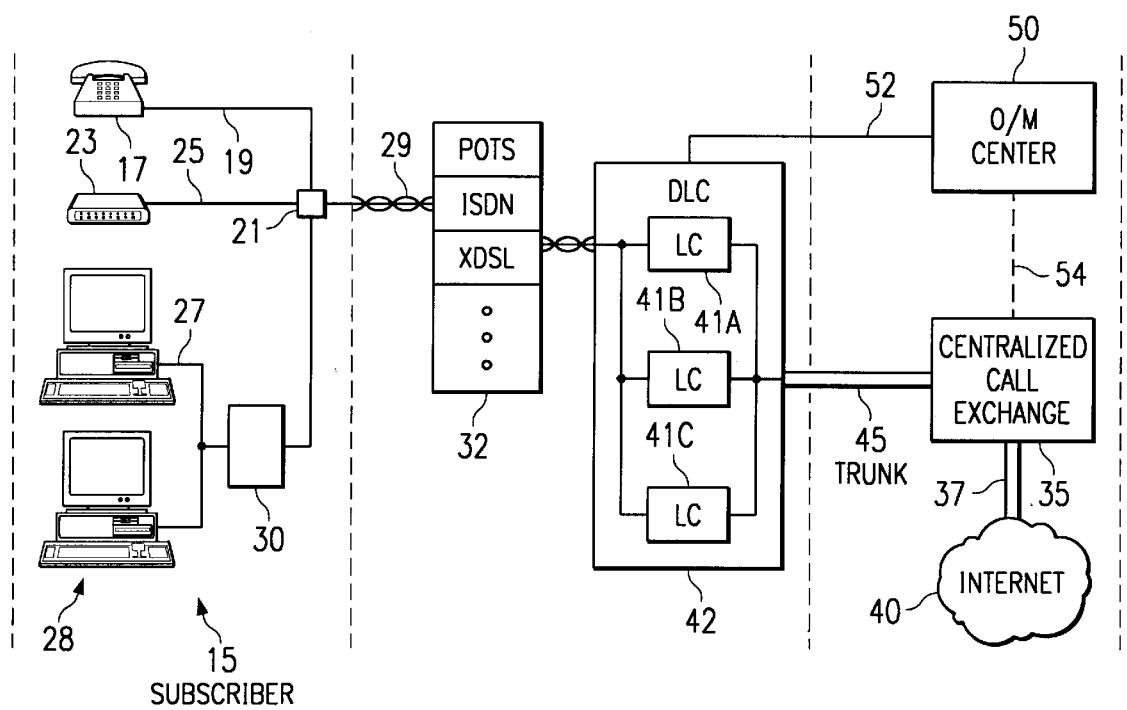
FIG. 1 is a functional block diagram of a digital loop carrier (DLC) system in a typical communications network.

The present invention is a software defined digital loop carrier system that permits changes in hardware and software interfaces for subscriber services to be made at a single central location providing cost effective deployment of new communications technology. With reference to FIG. 1, a communications system utilizing a digital loop carrier (DLC) is shown and denoted generally as 10. In essence, a subscriber 15 utilizes a communications device, such as a modem or router, to obtain access to an information service provided by a third party within the system 10. An example would include the subscriber 15 obtaining access to the Internet 40 by dialing into the centralized call exchange facility 35 using modem 23.

Typically the subscriber 15 has a choice in the type of communications equipment used to access the centralized call exchange facility 35. The centralized call exchange facility 35 is often the central office or telco serving subscribers within the local exchange area of the subscriber 15. In typical telephone applications, the subscriber 15 uses a plain old telephone system (POTS) 17 to access the line 19 leading to demarcation point 21 which marks the point between the subscriber side of the system 10 and the rest of the network. The line 19 is twisted pair wiring of the type found in many PSTN installations. The POTS 17 generates analog signals within the voice band frequencies of 300 to 3.4 kHz.

Another option is available to the subscriber 15, is the modem 23 communicating over line 25 coupled to the demarcation point 21. The modem 23 can be coupled to the same line 19 as the POTS 17 as indicated by the dashed line. Typically the modem 23 is operated by a computer (not shown) with suitable application programs and hardware facilities to operate the modem 23 and cause it to access the line 25.

Another configuration available to the subscriber 15 is network terminal 28 which is often a client terminal in a multi-user environment such as a local area network (LAN), wide area network (WAN), or other similar network environment. The network terminal 28 is typically configured to access line 27 which connects the terminal 28 to a central access hub 30. The central access hub 30 can be a router, switch, gateway, or other similar node to the network. In this way, multiple users within the same network can gain access to the system 10 and the centralized call exchange facility 35 via a single access node, namely hub 30. It should be understood that other access mechanisms and system configurations can be employed by a subscriber 15 to access facilities not identified as customer premise equipment.

Depending on the communications protocol utilized by the subscriber 15 to access the centralized call exchange 35, the quality and characteristics of signal beyond demarcation point 21 to the centralized call exchange facility 35 can vary. Block 32 is representative of the signaling channel using the various types of signal protocols available to the subscriber 15 including POTS, ISDN, and xDSL. As is known to those of ordinary skill, digital subscriber line (xDSL) technology enables high speed modems to transmit large amounts of data over existing copper telephone lines. Block 32 encompasses both the transmission medium and communications protocol used within the signaling channel by the subscriber 15.

As variations of the xDSL protocol emerge, including asymmetric digital subscriber line (ADSL), symmetric digital subscriber line (SDSL), high bit rate digital subscriber line (HDSL), and very high rate digital subscriber line (VDSL), the subscriber 15 may need to update the software and equipment necessary to implement such protocols. This may entail buying a new modem or updating the existing modem 23. The subscriber may also have to update the applications which control the modem 23 or that reside on the terminal 28.

The signal content generated at the subscriber end of the system 10 is carried over the communications channel 32 and delivered to the DLC 42. Typically, the DLC 42 is located at the remote end of the centralized call exchange facility 35 and is arranged to service multiple subscriber loops within a given geographic area. Until the present invention, a single subscriber loop 29 was handled by a single line circuit 41 within the DLC 42. The line circuits 41 were configured to service a subscriber according to the type of service utilized by the subscriber over the connection.

Prior to the present invention, the functionality of the DLC 42 was determined during installation in the service area. Thus, the architecture of the DLC 42 was a function of the hardware components, software structure, and call/session/connection/management functions originally installed.

The DLC 42 is coupled to the central call exchange facility 35 through trunk line 45 which completes the signal pathway between the subscriber 15 and the central call exchange facility 35. Typically, the trunk line 45 is a high speed digital connection which assures adequate transmission rates for signals originated from the subscriber 15. In other configurations, the trunk line 45 is a switched connection between the subscriber 15 and the centralized call exchange facility 35. Still other transmission channels may be utilized between the DLC 42 and the centralized call exchange facility 35.

In a common application, the subscriber 15 may use modem 23 to dial into the centralized call exchange facility 35 and reach the Internet 40 which is coupled to the centralized call exchange facility through the Internet backplane 37. The DLC 42 will support a variety of signaling protocols over the channel 32 according to the interface employed by the subscriber 15. With the introduction of new signaling schemes, however, the deployment of new technologies means that the hardware and the software configuration of prior art DLCs must often be modified. This is because most typical DLCs have interfaces and protocol specific hardware that do not provide remote reconfiguration and bandwidth optimization based on the subscriber interface. The present invention provides a software defined digital loop carrier system based on high speed A/D converters and digital signal processors capable of sampling several MHZ of bandwidth.

According to the invention, the DLC 42 includes a reprogrammable architecture that can use all the spectrum on a single copper twisted pair so as to eliminate the expensive upgrades at the remote sites supporting a group of subscribers. An operations and management center 50 is provided and communicably coupled to the DLC 42 to allow software downloading that updates the functionality of the DLC 42. In this way, the DLC 42 can be adapted to keep pace with newly deployed communications protocols available to the subscriber 15.

Since the DLC 42 is reprogramable, it provides flexibility in the provisioning of services without hardware reconfiguration, allocation or management. Thus, no cables or interface boards have to be changed to handle changes in the subscriber loops, and the line circuits between the subscriber 15 and the DLC 42 remain the same.

The invention also includes a shared common media pathway 52 between the operations management center 50 and the DLC 42 that allows downloading of new or updated software protocols and data processing maintenance to be done at a central location. The fact that the common media pathway 52 exists allows secure location control of such new and updated protocols and easy deployment of software upgrades to the DLC 42. In addition, the existence of the common media signal pathway 52 allows the software necessary to implement newer developing communications protocols to be kept remotely at the operations management center 50. This allows standardization for cost effective deployment of new technology.

Figure 2:
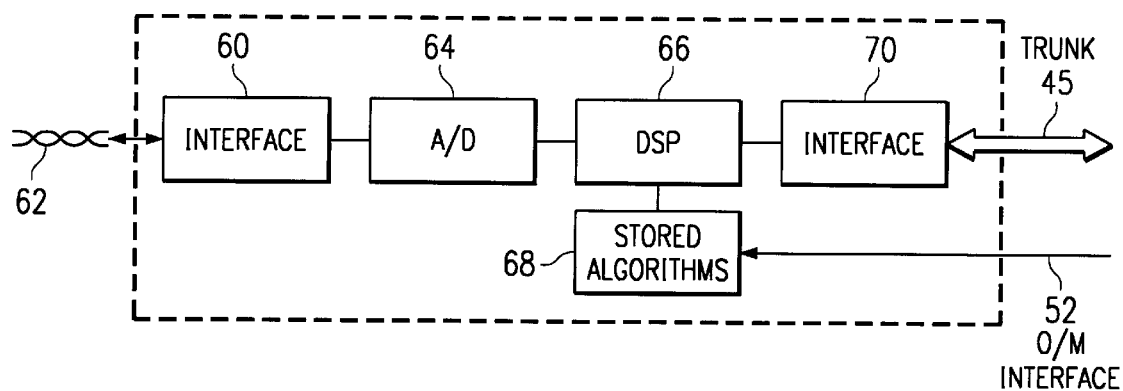
FIG. 2 is a functional block diagram of DLC according to one embodiment of the invention.

With reference to FIG. 2, therein is shown a block diagram of a line circuit 75 according to one embodiment of the invention. The line circuit 75 can be utilized in the DLC 42 and includes a first interface 60 which provides access to a subscriber line wire pair 62 used for transmitting signals between a subscriber 15 and the DLC 42. The interface 60 is configured to provide the correct line characteristics depending on the type of signaling channel coupling the DLC 42 and the subscriber 15.

In the upstream direction, signals from a subscriber 15 arrive over the subscriber line 62 and are delivered to the line circuit 75 via interface 60. Next the signals are transferred to the analog to digital converter circuit 64 which samples incoming analog signals arriving over the subscriber line 62 and converts them to equivalent digital data sequences. The sampling and conversion algorithm employed by the A/D converter 64 are well known. The A/D converter 64 is coupled to a digital signal process (DSP) 66 which implements the communications protocol utilized between the subscriber 15 and the line circuit 75. Examples of such communications protocols include ISDN, POTS, V.90, V34 and the emerging variety of xDSL interfaces.

As shown, the line circuit 75 includes a memory space 68 for storing a plurality of software algorithms that control the functionality of the DSP 66. The memory space 68 can be equipped with a service port or terminal to permit the operations and management center 50 to perform such updates. Preferably, the A/D converter 64 has a sufficiently high sampling rate and dynamic range to support high rate protocols such as the emerging variety of xDSL protocols. Likewise, the DSP 66 has sufficient processing power to execute any of the algorithms stored in the memory space 68 necessary to implement such protocols. The stored algorithms contain the instructions to the DSP 66 that implement subscriber side communications protocols. The fact that the DSP 66 has sufficient dynamic range to execute the software algorithms in memory space 68 eliminates the need to make physical hardware changes of the hardware or software in the DLC 42.

For example, should the subscriber 15 want to change from being an analog subscriber using POTS to an ISDN subscriber or one of the xDSL variant protocols, the change can be implemented in the memory space 68 through the stored algorithms. The stored algorithms operate the DSP 66 and cause it to implement the communications protocol desired by the subscriber 15. With the A/D converter 64 having a sufficiently high sampling bandwidth and dynamic range, protocols are implemented in the digital domain so that it is no longer necessary to rely on discrete components to implement the interface to the subscriber side. This eliminates or reduces physical hardware changes at the DLC 42. Signals from the subscriber's side are converted to digital by the A/D converter 64 and the protocols are implemented in the DSP 66 utilizing the instructions contained in the memory space 68.

Figure 3:
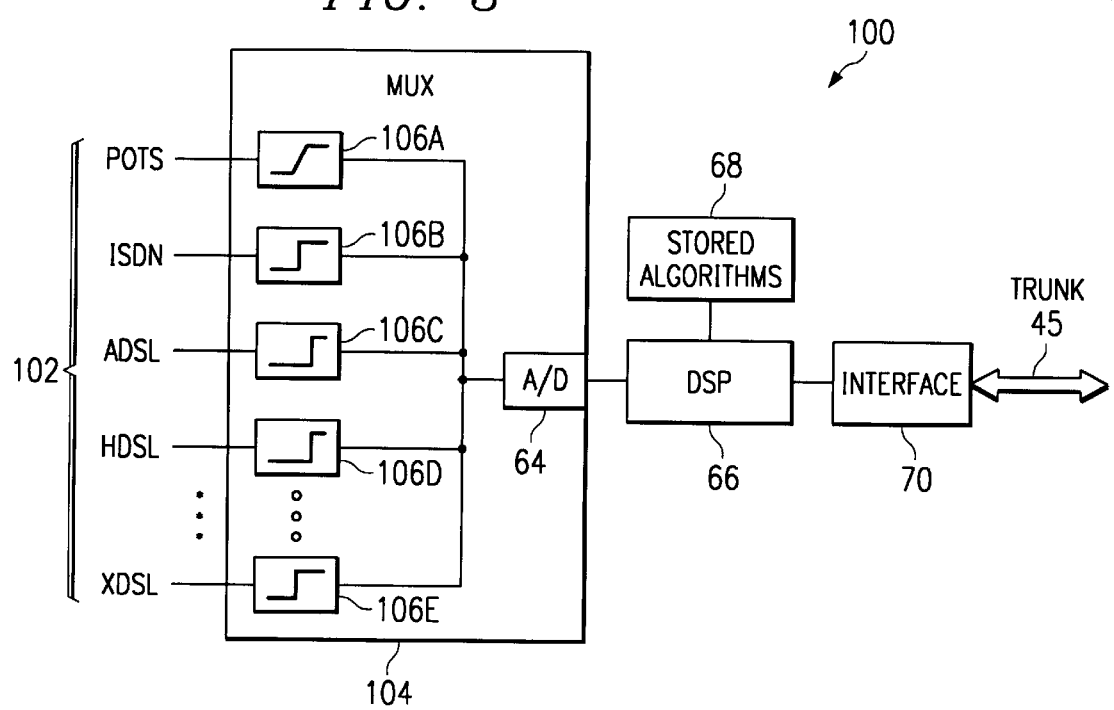
FIG. 3 is a block diagram of a DLC supporting multiple subscriber line connections through a single signal processor.

In one embodiment, the A/D converter 64 is capable of sampling, and the DSP 66 is capable of processing, several MHz of bandwidth according to currently available DSP core architectures. Since each copper pair from a subscriber supports less than 1 MHz bandwidth, it is possible to attach more than one subscriber pair to the DSP 66. Sampling across multiple subscriber lines can be accomplished by upbanding each pair with staggered amounts so that all pairs reside in distinct spectral bands. A line circuit configuration suitable for this purpose is shown in FIG. 3 wherein a plurality of programmable frequency shift devices 106A:106E are coupled to the subscriber side line pairs based on the spectral content associated with each line pair. The entire bandwidth containing all spectral bands can be sampled and digitized by the A/D converter 64 and DSP 66. The encoded results can be transmitted back to the centralized call exchange facility 35 for decoding into a relevant signaling scheme based on the service associated with each subscriber.

The fact that the DSP 66 can be reprogrammed and can use all the spectrum that a subscriber line wire pair 62 contains eliminates "frozen" technology at remote sites and reduces "trunk roll" for subscriber access upgrades allowing the introduction of new technology by updates in the stored algorithms of memory space 68 through the operations and management center 50 and common media signal pathway 52.

The digitized signal patterns created by the DSP 66 are transferred to a second interface 70 to the trunk line 45 connecting the line circuit 75 to the centralized call exchange facility 35. The interface 70 is configured to receive processed signals from DSP 66 conforming to the communications protocol being implemented as dictated by the stored algorithms in the memory space 68.

A feature of the invention is that the processing resources of the DSP 66 may be shared. Thus, DSP 66 may be able to service a plurality of subscriber line pairs since currently available DSP and A/D converter architectures can sample more bandwidth at higher resolution than required to support a single subscriber connection. For example, in one embodiment, the DSP 66 has a sampling rate of at least 100 Mbits/s. The architecture of a line circuit employing such configuration is shown and denoted generally as 100 in FIG. 3.

With reference to FIG. 3, multiple subscriber line pairs 102 are coupled to a line multiplexer 104 or other similar multiplexing means capable of routing signals over the pair 102 into the DLC 42. The line multiplexer 104 includes an array of programmable frequency shift devices 106A:106E that are coupled to individual subscriber line pairs.

Depending on the service associated with each line pair, the programmable frequency shift devices 106A:106E can be tuned to the appropriate spectral band. For example, for POTS service, the programmable frequency shift device 106A can be programmed for a pass band of between 30 Hz to 4 kHz. Likewise, the xDSL line pairs can be coupled to programmable frequency shift devices 106B:106E which are set to pass a band of between 10 kHz to 1 MHz.

The line multiplexer 104 includes the AND converter 64 which, in turn, is coupled to the DSP 66 as before. The fact that the line pairs 102 are coupled to the line multiplexer 104 means that a single DSP 66 is able to service a number of subscriber lines. The configuration 100 is possible since A/D converters and DSPs now available can sample more bandwidth at higher resolution than is required to support a single line. In practice each line pair can be upbanded in frequency prior to AND conversion by the AND converter 64.

The A/D converter 64 can sample an incoming signal within the transmission band associated to each copper wire pair depending on the service utilized by the subscriber. The stored algorithms in the memory space 68 control the upband operation of the DSP 66 as well as the sampling rate of the A/D converter 64 and DSP 66. In one embodiment, the stored algorithms include an instruction set that controls the frequency versus the sampling rate features of the DSP 66 based on the service subscription of the subscriber 15.

Digitized signals from the DSP 66 are transferred over the trunk line 45 to the central office call exchange facility 35. As shown in FIG. 1, the centralized call exchange facility 35 can be operably coupled to the operations management center 50. The signal pathway 54 between the operations management 50 center and the centralized call exchange facility 35 is indicated by the dashed line.

The update and deployment functions enabled by the common media pathway 52 can be implemented through the centralized call exchange center 35. A logical pathway is established utilizing the signal pathway 54 between the operations management center 50 and the centralized call exchange facility 35 and the trunk line 45 coupling the centralized call exchange facility 35 to the DLC 42. In this manner, the centralized call exchange facility 35 can handle upgrades within the DLC 42 through the trunk line 45. It should be understood that other ways of programing the functionality of the DSP 66 by updating the stored programs of memory space 68 can be achieved.

Although the invention has been described with respect to particular embodiments it should be understood that various changes, substitutions and alterations can be made without departing from the spirit and scope of the invention as defined by the appended claims.

What is claimed is:

1. A communications system with centralized protocol update and management comprising:

a digital loop carrier (DLC) with a first interface to a plurality of subscriber line pairs and a second interface to a central call exchange facility, the DLC configured to route signals arriving through said subscriber line pairs to said central call exchange facility, the DLC containing a memory space with software algorithms that control communications protocols supported by said DLC; and an operations/management facility communicably coupled to said DLC and configured to modify said software updates remotely wherein said DLC includes a multiplexor coupled to said plurality of subscriber line pairs and wherein said multiplexor includes an array of programmable frequency shift devices, each of said devices coupled to an individual subscriber line pair.

2. The communications system according to claim 1 wherein each of said frequency shift devices is programmed to a pass band appropriate for the communications protocol utilized over the corresponding subscriber line pair.

3. The communications system according to claim 1 wherein said DLC includes an analog to digital converter with a sufficiently high sampling rate to support xDSL signals.

4. The communications system according to claim 1 wherein said includes a multiplexor coupled to said plurality of subscriber line pairs.

5. The communications system according to claim 1 wherein the memory space stores a set of software algorithms and is coupled to said DLC.

6. The communications system according to claim 5 wherein the software algorithms contains instructions that control the protocol supported by said DLC.

7. The communications system according to claim 5 wherein said software algorithms contain instructions capable of implementing an xDSL protocol.

8. The communications system according to claim 1 further comprising an analog to digital converter interspersed between said first interface and said DLC.

9. The communications system according to claim 8 wherein said analog to digital converter has a sufficiently high sampling rate to support an xDSL protocol.

10. The communications system according to claim 1 wherein said DLC is a digital signal processor with sufficient processing power to support xDSL protocol signals.

11. The communications system according to claim 1 wherein said signal processor is a digital signal processor with a sampling rate of at least 100 Mbits/s.

12. The communications system according to claim 1 wherein said DLC is reprogrammable.

13. The communications system according to claim 1 further comprising:

a plurality of line circuits coupled to said subscriber line pairs according to a protocol utilized over each pair; and the second interface coupled to a trunk line leading to said centralized call exchange facility.

14. The communications system according to claim 13 Wherein each of said line circuits includes:

a signal circuit converter coupled to at least one subscriber wire pair; and a signal processor communicably coupled to said signal converter and configured to support the signal protocol utilized over said line pair.

* * * * *